US012715655B2

(12) United States Patent
Huber

(10) Patent No.: US 12,715,655 B2
(45) Date of Patent: Aug. 25, 2026

(54) PACKAGED DOUGH PRODUCT AND METHOD OF PACKAGING

(71) Applicant: General Mills, Inc., Minneapolis, MN (US)

(72) Inventor: Benjamin J. Huber, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 321 days.

(21) Appl. No.: 18/243,399

(22) Filed: Sep. 7, 2023

(65) Prior Publication Data

US 2025/0083868 A1 Mar. 13, 2025

(51) Int. Cl.

| | |
|---|---|
| ***B65D 25/04*** | (2006.01) |
| ***A21D 10/02*** | (2006.01) |
| ***B65B 7/28*** | (2006.01) |
| ***B65D 77/08*** | (2006.01) |
| ***B65D 77/20*** | (2006.01) |

(52) U.S. Cl.

CPC ........... *B65D 25/04* (2013.01); *A21D 10/025* (2013.01); *B65B 7/28* (2013.01); *B65D 77/08* (2013.01); *B65D 77/20* (2013.01); *B65B 2230/02* (2013.01)

(58) Field of Classification Search

CPC ........ B65D 25/04; B65D 77/08; B65D 77/20; B65D 15/02; B65D 81/3216; B65D 85/36; A21D 10/025; B65B 7/28; B65B 2230/02

See application file for complete search history.

(56) References Cited

U.S. PATENT DOCUMENTS

| | | | |
|---|---|---|---|
| 1,514,379 A | 11/1924 | Fleischer | |
| 2,039,374 A | 5/1936 | Young | |
| 2,253,273 A | 8/1941 | Haycock | |
| 2,409,279 A | 10/1946 | Hiller | |
| 2,559,101 A | 7/1951 | Wool | |
| 2,949,369 A | 8/1960 | Zoeller et al. | |
| 3,057,536 A | 10/1962 | Warnsdorfer, Jr. et al. | |
| 3,182,890 A | 5/1965 | Elam | |
| 3,303,964 A | 2/1967 | Luker | |
| 3,307,739 A | 3/1967 | Cloyd et al. | |
| 3,506,459 A | 4/1970 | Parlour | |
| 3,552,593 A | 1/1971 | Szopo | |
| 3,790,061 A | 2/1974 | Pignato | |
| 3,851,757 A | 12/1974 | Turpin | |
| 3,962,476 A | 6/1976 | Turpin | |
| 4,114,784 A | 9/1978 | Kough et al. | |
| 4,919,949 A | 4/1990 | Miltz et al. | |
| 5,538,217 A | 7/1996 | Chauhan | |
| 5,950,913 A | 9/1999 | Rea et al. | |
| 6,109,470 A | 8/2000 | Antal, Sr. et al. | |
| 6,116,500 A | 9/2000 | Cahill | |
| 6,293,422 B1 | 9/2001 | Jentzsch et al. | |
| 8,684,218 B1 | 4/2014 | Stravitz | |
| 9,682,791 B2 | 6/2017 | Lorence et al. | |
| 9,828,138 B2 | 11/2017 | Buccellato | |
| 10,934,050 B2 * | 3/2021 | Lagace | B65D 3/24 |
| 12,114,667 B2 * | 10/2024 | Shook | B65D 15/04 |
| 2005/0029258 A1 | 2/2005 | Juliano et al. | |
| 2005/0284307 A1 | 12/2005 | Vovan | |
| 2013/0129874 A1 | 5/2013 | Fenske et al. | |
| 2013/0213841 A1 | 8/2013 | Ward | |
| 2016/0075497 A1 | 3/2016 | Folatelli | |
| 2016/0107794 A1 * | 4/2016 | Buccellato | B65D 25/04 426/19 |
| 2016/0107817 A1 | 4/2016 | Thornton et al. | |
| 2017/0008658 A1 | 1/2017 | Lagace et al. | |
| 2017/0253377 A1 | 9/2017 | Mitrey et al. | |
| 2019/0292007 A1 | 9/2019 | Khan et al. | |
| 2019/0359408 A1 | 11/2019 | Kackman et al. | |

FOREIGN PATENT DOCUMENTS

| | | |
|---|---|---|
| DE | 202012102257 U1 | 8/2012 |
| FR | 2303725 A1 | 10/1976 |
| JP | 2009280285 A * | 12/2009 |
| KR | 200351885 Y1 | 6/2004 |
| KR | 20190115842 A | 10/2019 |

OTHER PUBLICATIONS

Rolling With the Pham video (Apple Pie Cinnamon Rolls | Easy Pillsbury Cinnamon Roll Recipe | Cinnamon Rolls Casserole. Comments from 5 years ago (2020). Obtained on Sep. 2, 2025 from URL :< https://www.youtube.com/watch?v=SS6LMhk2OZw&Ic=UgzPB_MxklJbnhoClop4AaABAg>. (Year: 2020).*

* cited by examiner

*Primary Examiner* — Erik Kashnikow
*Assistant Examiner* — Janice Y Silverman
(74) *Attorney, Agent, or Firm* — Jordan IP Law, LLC; Tina Yin Sowatzke, Esq.

(57) ABSTRACT

A packaged food product includes a container having therein a cup for a food ingredient, at least one dough product and a plastic separator interposed between the cup and the at least one dough product. The separator seats upon a rim of the cup and includes a peripheral side surface in frictional engagement with an inner sidewall of the container. The separator has a convex or dome shape when initially inserted into the container but, when the dough product(s) proof within the container, forces applied to the separator from the developed pressure cause the separator to flatten while radially expanding in order to establish an effective frictional fit with the sidewall of the container. An underside of the separator can optionally include reinforcing ribs.

19 Claims, 3 Drawing Sheets

PACKAGED DOUGH PRODUCT AND METHOD OF PACKAGING

BACKGROUND OF THE INVENTION

The invention pertains to the art of food production and, particularly, to a packaged dough product, as well as a method of packaging the dough product. More specifically, the present invention relates to a tubular container for packaging one or more dough products wherein at least one additional ingredients is provided in a separate cup within the tubular container, with a non-metal separator being interposed between the cup and the dough product(s).

Due to the time demands placed on consumers by the everyday activities of modern life, the preparation of food products and meals from scratch has decreased and the popularity of premade or partially premade foods has increased dramatically. One type of food product that has become increasingly popular in premade configurations are dough-based food products such as, for example, developed and undeveloped dough products. These dough products can be stored in either a refrigerated or frozen state for extended periods and are "freshly" prepared in a matter of minutes as desired by the consumer. In some instances, these dough products can represent a substantially final product requiring only a heating or baking step such as, for example, cookies, bread, breadsticks, biscuits, rolls and croissants. Alternatively, these dough products can represent components or building blocks of a final product such as, for example, a pie crust or pizza dough that will be combined with a variety of other ingredients to form the final product. Regardless of whether the dough product itself constitutes a final product or merely a component of the final product, these dough products constitute enormous time savers for the consumer in that the consumer need not prepare the dough products from scratch using base ingredients such as, for example, flour, water, eggs, yeast, salt, sugar and the like.

One popular method for packaging and storing dough products has been to use a can format where the dough product is contained within a cylindrical paperboard body having caps at both ends of the body. In such a container, the can body is torn open by the consumer to expose the can contents and enable the removal of individual dough products without substantial product deformation. While the can format does work very well for dough products alone, there are some instances in which it is desirable to include additional ingredients with the dough product to complete or enhance enjoyment of the final cooked dough product. Such additional ingredients can include, for example, condiments, fruits, icing, spices, nuts, candies and the like. To accommodate these additional ingredients in a can format, a variety of designs have been utilized for separating the additional ingredients from the dough. Certain known configurations employ the use of separate cups to store the additional ingredients. One common configuration employs a plastic cup covered by a thin metal lid or separator, generally stamped from an aluminum sheet. In the case of proofing of the dough products in the packaging, these cans and cups must be constructed to withstand substantial internal pressures. In connection with known metal lids, they have been found to be quite effective in withstanding deformation under the developed pressure. Still, there would certainly be cost and recycling benefits in employing plastic versus metal of these lids or separators. Unfortunately, plastic simply has less inherent strength and, given the desire to maintain a thin profile and reduce the amount of material employed, the use of metal separators dominates the market.

SUMMARY OF THE INVENTION

A packaged food product and method according to the invention includes a close-ended container body within which is located a cup for an additional ingredient, as well as one or more dough pieces atop the cup. Like the known prior art, the container body preferably constitutes a cylindrical, spirally wound paperboard body, although other materials could be employed. The cup includes a bottom wall and at least one sidewall leading to an upper annular rim defining an opening, opposite the bottom wall, with the opening leading to an interior storage cavity of the cup and being covered by a plastic separator which seats upon the rim. More specifically, the separator includes a main body portion generally in the form of a disc having a convex or dome shape having a peripheral edge portion which supports the separator upon the rim.

The packaging process generally involves initially inserting the cup into an opening at a first end of the container, with the cup being either subsequently or pre-filled with one or more additional food ingredients. In one preferred embodiment, the cup is pre-filled with icing, although a wide range of additional ingredients could be employed. The cup is shifted within the container to a second, opposite end of the container. Either prior to inserting the cup or immediately thereafter, the separator is situated, with the main body portion sitting on the rim of the cup. A minimal tolerance is provided to enable initial insertion of the separator into the container. The second end of the container is sealed with an end closure or cap, either before or after insertion of the cup, one or more dough products are deposited into the container through the opening at the first end of the container, and then the opening at the first end is closed by another end closure or cap. During storage, the one or more dough products proof and expand, thereby increasing the pressure within the container. The forces exerted on the separator, particularly at a central portion of the convex or domed main body portion of the separator where the material would be particularly prone to deformation, deflect the central portion, causing the separator to radially, dimensionally expand and essentially establish a friction fit with the sidewall of the container.

In one exemplary embodiment, the above packaging and method are used with icing as the additional ingredient and a plurality of cinnamon rolls as the dough pieces, and the sidewall of the container comprises a spirally-wound construction of an inner liner layer, an outer label layer and one or more intermediate layers of composite material, while both the cup and the entire separator are molded of plastic. The container and cup are both generally cylindrical. In addition, in particularly preferred embodiments, the separator is made of recyclable plastic and may include various radial reinforcement ribs.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
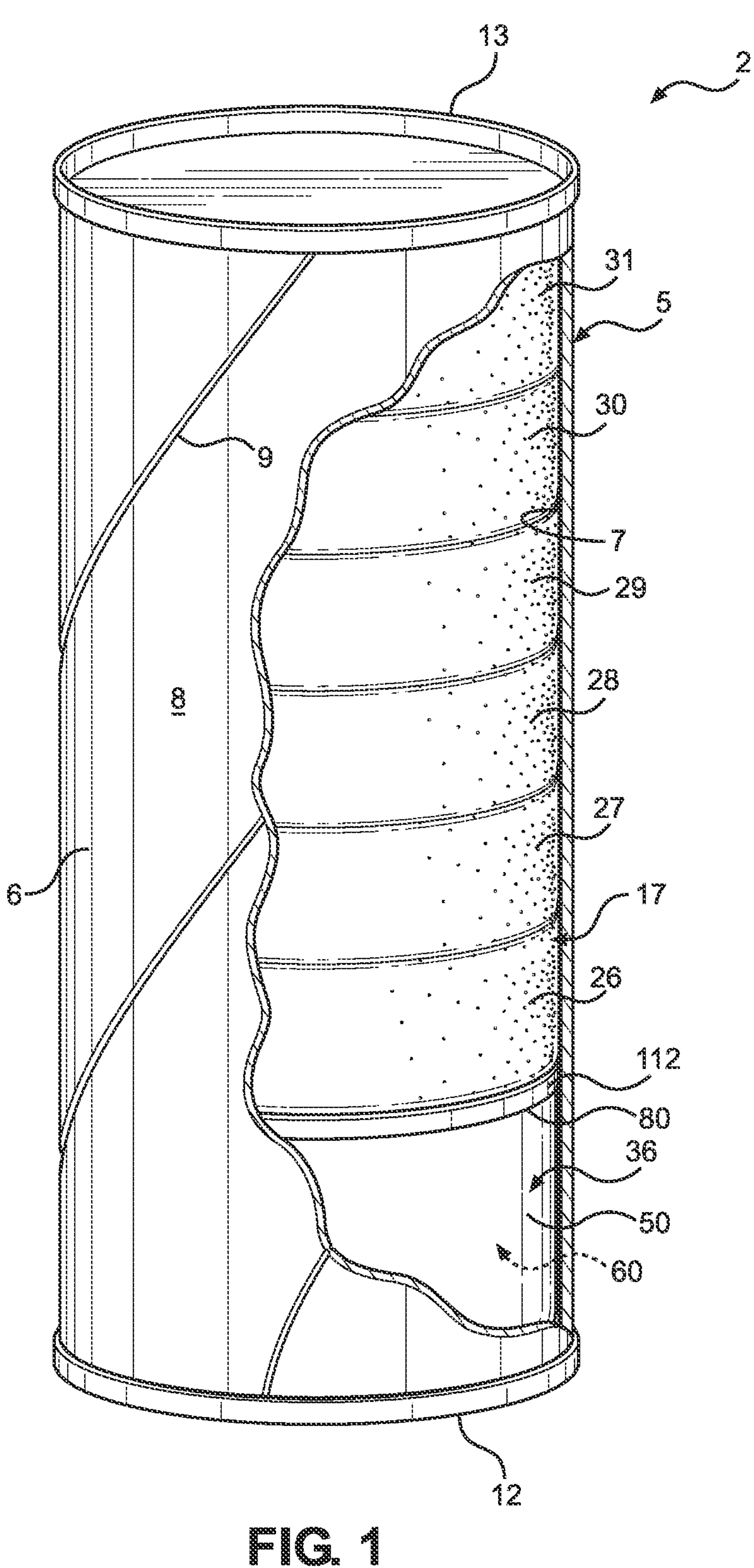
FIG. 1 is a perspective, partial cross-sectional view of a final packaged food product produced in accordance with the present invention.

With initial reference to FIG. 1, there is shown a packaged food product 2 produced in accordance with the present invention. Packaged food product 2 comprises a container or can 5. Container 5 takes the form of a tube and includes a sidewall 6 having an inner surface 7 and an outer surface 8. In the embodiment shown, sidewall 6 is made of a composite material (e.g., paperboard) and is shown to include a spiral seam 9. Specifically, in a preferred embodiment, sidewall 6 comprises a spirally-wound construction of an inner liner layer of plastic and/or foil, an outer paper label layer and one or more intermediate layers of thin paperboard. Container 5 is closed at both ends, such as with first and second end closures or endcaps 12 and 13, which are crimped, seamed or otherwise secured to the bottom and top of sidewall 6, respectively, to establish an interior cavity 17. Endcaps 12 and 13 can be made from metal or plastic, for example.

One or more dough products are located within interior cavity 17. Specifically, in the embodiment shown, interior cavity 17 contains a plurality of stacked dough products 26-31 in the form of dough discs, which are used to make cinnamon rolls. However, at this point, it should be realized that the invention can be utilized in packaging various types of dough products, including dough discs, one or more sheets of dough or even a block of dough, for making a wide range of final products, including cookies, bread, biscuits, rolls, croissants, pie crust, pizza dough and the like.

Dough products 26-31 generate substantial pressure within container 5 during storage. In particular, dough products 26-31 undergo chemical reactions and generate gas pressure in a process known as "proofing". Preferably, can 5 is configured to withstand internal pressures in the range of 8 to 35 psi (55 to 241 kPa) so that can 5 remains intact over the shelf life of dough products 26-31. To withstand such pressure, endcaps 12 and 13 engage end portions of sidewall 6, such as through a process of crimping or seaming, to retain dough products 26-31 despite significant force acting directly or indirectly on endcaps 12 and 13.

A cup 36 is shown positioned below dough products 26-31 within interior cavity 17. At least one additional food ingredient for use with dough products 26-31 is located within cup 36. For example, in the embodiment shown where dough products 26-31 take the form of discs used to make cinnamon rolls, cup 36 contains an additional food ingredient in the form of icing, which can be spread upon the subsequently cooked cinnamon rolls. In other embodiments, cup 36 can contain other ingredients such as garlic, herbs, spices, seasoning, cheese, butter, condiments, sauces, fruits, nuts, candies or the like. If desired, cup 36 can contain a plurality of additional food ingredients or multiple cups can be provided within interior cavity 17, each containing an additional food ingredient.

As illustrated, cup 36, like container 5, is generally cylindrical and includes a sidewall 50 and a bottom wall 55 (see FIG. 4), which together define an inner cavity 60 for the one or more additional food ingredients. Cup 36 further includes an upper, annular rim 80, which defines an opening (not separately labeled) opposite bottom wall 55, i.e., cup 36 has an open top leading to inner cavity 60. Important in connection with the present invention is the inclusion of a lid or separator 112 which is shown in FIG. 1 positioned atop annular rim 80 of cup 36.

Further details of separator 112 and its importance in accordance with the overall invention will now be described in detail with specific reference to FIGS. 2-4. Separator 112 is formed from a non-metal material, preferably integrally molded of recyclable plastic, and generally takes the form of a disc, while being convex or domed shaped. That is, although separator 112 can take other shapes, at least in a relaxed state, separator 112 includes a generally convex upper surface 130 (see FIG. 4) and a generally concave lower surface 132 (see FIGS. 2 and 3). More specifically, with particular reference to FIG. 4, upper surface 130 has, radially outward starting at its center, a central, recessed region 134, a generally smooth main section 136, a slightly raised plateau region 138, an annular raised section 140 and a circumferential edge section 142. Circumferential edge section 142 defines, in part, a downturned (relative to convex upper surface 130) peripheral side wall 148 which terminates in a lower flared section 150. As clearly shown in FIGS. 2 and 3, lower flared section 150 forms an extension of a smooth and preferably flat, lower seating ring 152 which is configured to directly rest upon rim 80 when separator 112 sits upon cup 36 as shown in FIG. 4.

Figure 2:
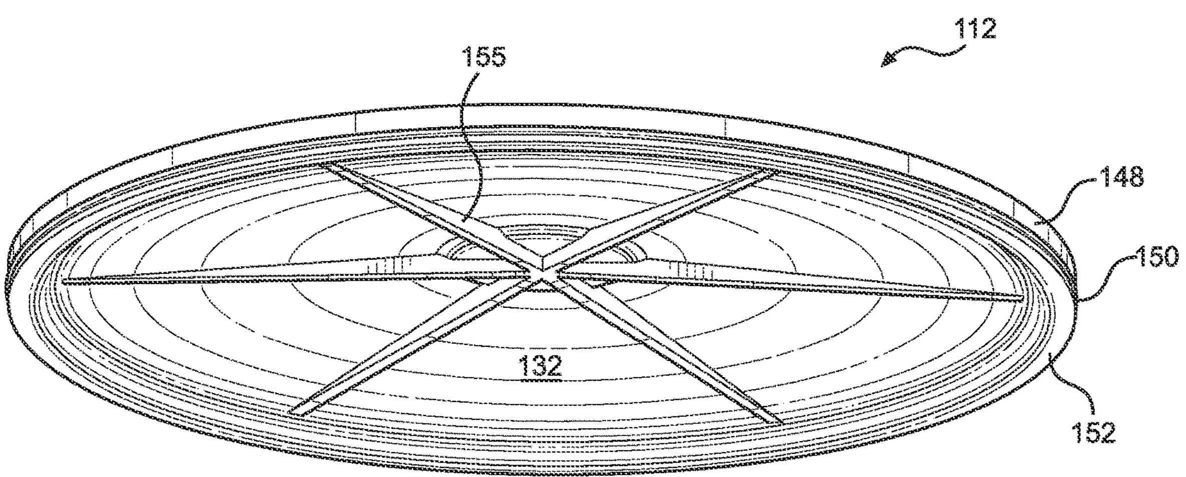
FIG. 2 is a lower perspective view of a separator, constructed in accordance with one embodiment of the invention, employed in the packaged food product of FIG. 1.
Figure 3:
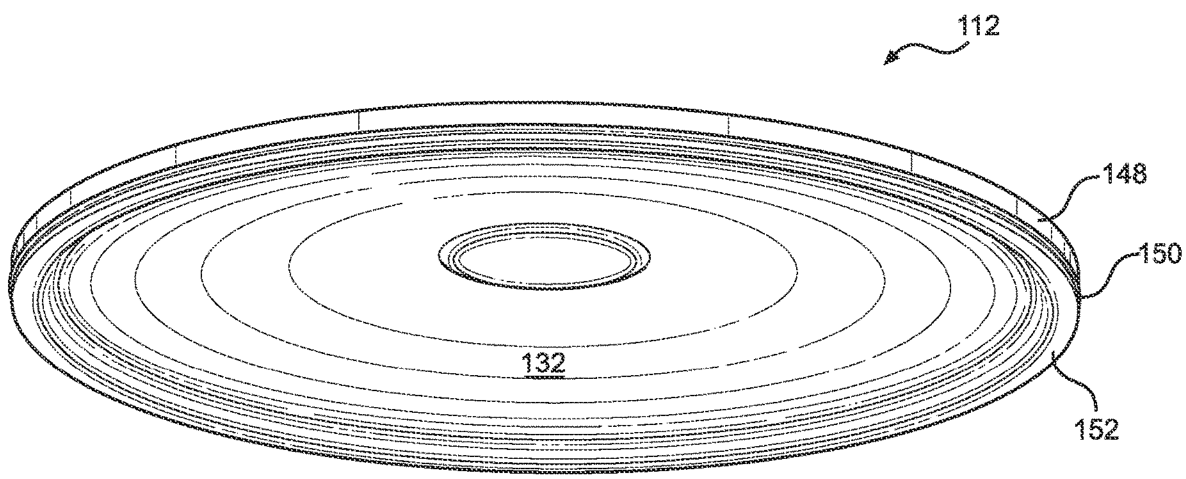
FIG. 3 is a lower perspective view of a separator, constructed in accordance with another embodiment of the invention, employed in the packaged food product of FIG. 1.
Figure 4:
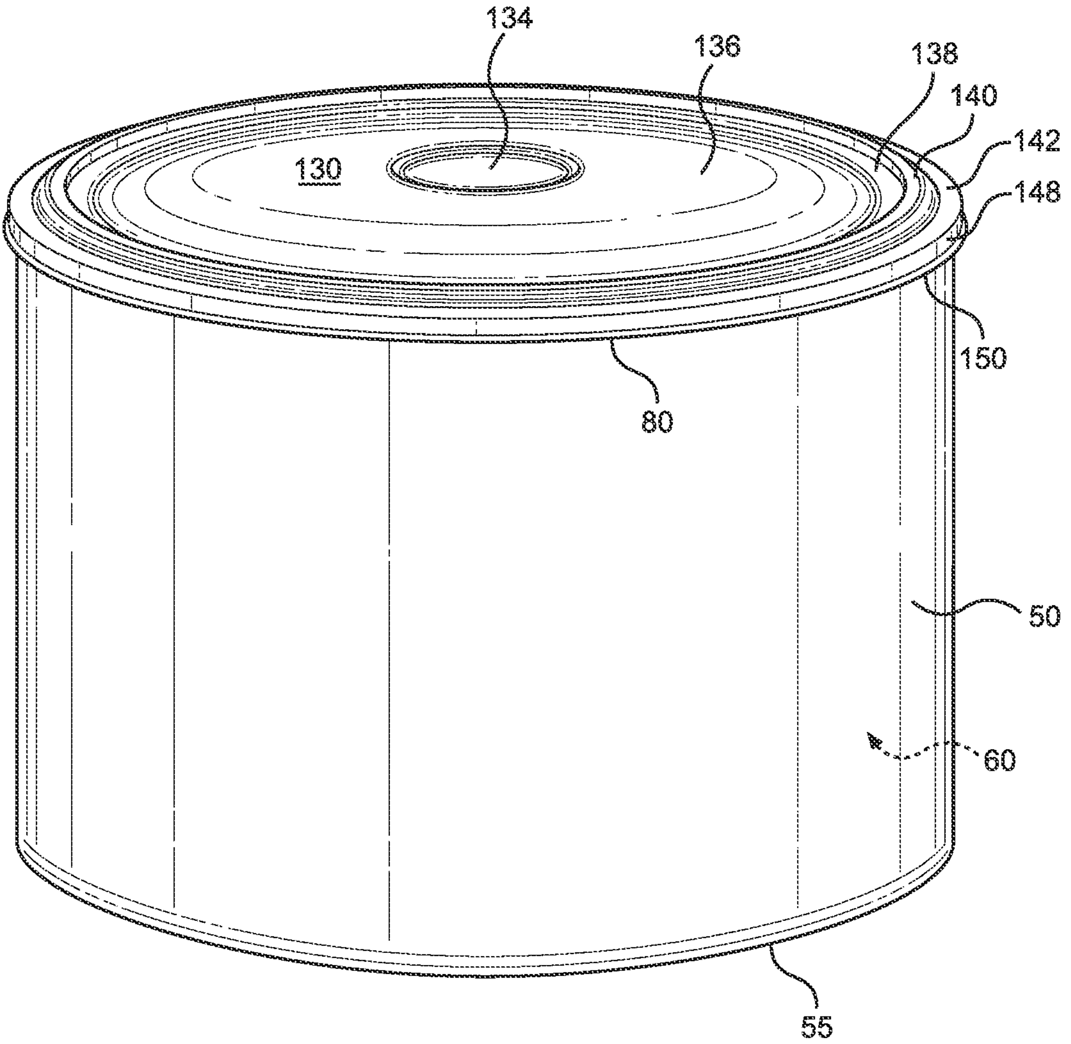
FIG. 4 is a perspective view illustrating the separator of either FIG. 2 or 3 atop a cup in the packaged food product of FIG. 1.

At this point, it should be noted that the only difference between the embodiments of FIGS. 2 and 3 is the inclusion of radial reinforcement ribs, one of which is labeled 155 in the FIG. 2 embodiment. Ribs 155 are shown to extend in a spoked arrangement from central region 134 to across main section 136 towards peripheral side wall 148. The depth of each rib 155 varies to track the contour of lower surface 132, i.e., each rib 155 tapers radially outward to account for the dome shape of upper surface 130 and each rib 155 projects from lower surface 132 at central region 134 a distance less than from lower surface 132 in at least a portion of the main section 136. As will be evident from the further description presented below, separator 112 is subjected to forces created within container 5, with the forces tending to flatten the convex or dome configuration of separator 112. Being made of plastic, separator 112 may not be as strong as known prior art metal separators such that ribs 155 can optionally be provided for structural reinforcement purposes.

Reference will now be again made to FIG. 1 in describing the packaging process for food product 2, with container 5 being shown in tubular form with openings at the top and bottom of sidewall 6. The packaging process generally involves initially inserting cup 36 into an opening at a first end of container 5, with cup 36 being preferably pre-filled with the one or more additional food ingredients, such as icing. Cup 36 is shifted within container 5 to a second, opposite end of container 5 which is closed off by endcap 12. Either prior to inserting cup 36 or immediately thereafter, separator 112 is situated, with lower seating ring 152 directly resting upon upper rim 80 of cup 36, with the lower flared section forming an extension of the lower seating ring sitting on rim 80 of cup 36. Although a certain tolerance is permitted to ease insertion of cup 36 into container 5, peripheral side wall 148, in particular lower flared section 150, has the larger diametric dimension and is specifically sized to slightly frictionally engage inner sidewall 7 of container 5 during insertion. For this reason, it should also be noted that separator 112 could be forced to shift within container 5 in various ways, such as employing a solenoid plunger or the like which pushes separator 112 down within container 5 to seat upon rim 80 of cup 36.

At this point, it should be noted that, in connection with this process, the lower end of container 5 can be sealed with end closure or cap 12, either before or after insertion of cup 36 and separator 112. In either case, subsequently, the one or more dough products 26-31 are deposited into container 5 through the opening at the first or upper end of container 5, and then the upper opening is closed by end closure or cap 13, such as through a crimping process. During storage, the one or more dough products 26-31 proof and expand, thereby increasing the pressure within container 5. The forces exerted on separator 112, particularly at central, recessed region 134 and main section 136 of separator 112, cause separator 112 to deform, i.e., deflect downward and flatten to reduce the curvature of the convex shape in at least recessed region 134 and main section 136, while also causing separator 112 to enlarge in radial dimension, i.e., radially expand, and establish a friction fit with sidewall 6 of container 5, thereby firmly retaining separator 112 in position atop cup 36 and sealing inner cavity 60 from the ingress of dough.

As discussed above, the additional food ingredient can comprise icing, which can be spread upon dough products 26-31 after dough products 26-31 are baked. While the icing could be in direct contact with cup 36, in other embodiments, the icing is provided in a pouch, with this pouch being located in cup 36. Of course, such an arrangement is not limited to icing but can also be used with the other additional food ingredients listed above (e.g., garlic, herbs, spices, seasoning, cheese, butter, condiments, sauces, fruits, nuts, candies, etc.).

Based on the above, it should be readily apparent that the present invention provides a cost-effective and efficient way to retain and isolate cups within cans when packaging dough products with additional ingredients, particularly by employing a separator made of recyclable plastic. With the structure of the separator, the separator can withstand the developed forces exerted thereon, with the forces effectively being utilized to re-shape the separator for a tight sealing fit within the container. Again, reinforcing ribs can optionally be provided. While certain preferred embodiments of the present invention have been set forth, it should be understood that various changes or modifications could be made without departing from the spirit of the present invention. For instance, although in the preferred embodiments both the container and cup are generally cylindrical in shape, it should be realized that different complementary geometric shapes could be employed, while still embodying a correspondingly shaped, domed separator and the frictional fit arrangement as detailed above. In general, the invention is only intended to be limited by the scope of the following claims.

The invention claimed is:

1. A packaged food product comprising:

a container including an interior cavity defined between at least one sidewall and spaced ends of the container;

a cup within the container, wherein the cup includes at least one sidewall, a bottom wall and an upper rim defining an opening, opposite the bottom wall, leading to an inner cavity of the cup;

at least one food ingredient within the cup;

at least one dough product within the interior cavity of the container; and a separator interposed between the cup and the at least one dough product, said separator being entirely made of plastic and including a convex upper surface, a concave lower surface, a peripheral portion downturned relative to the convex upper surface and engaging the at least one sidewall of the container, and a lower seating ring resting upon the upper rim of the cup wherein, upon increasing pressure in the interior cavity through proofing of the at least one dough product within the container, the convex upper surface is configured to deflect downward to reduce a curvature of the convex upper surface while the peripheral portion is shifted radially to establish a friction fit with the sidewall of the container, thereby firmly retaining the separator in position atop the cup and sealing the cup from any ingress of dough.

2. The packaged food product of claim 1, wherein the peripheral portion of the separator includes a downturned peripheral side wall which terminates in a lower, radially flared section.

3. The packaged food product of claim 2, wherein lower, radially flared section forms part of the lower seating ring which is flat and configured to directly rest upon the upper rim of the cup.

4. The packaged food product of claim 1, wherein the separator is configured to deflect downward to reduce the curvature of the convex upper surface in at least a central, recessed region and a main section of the separator.

5. The packaged food product of claim 1, wherein the separator includes a central region and a main section interposed between the central region and the peripheral portion.

6. The packaged food product of claim 5, further comprising a plurality of ribs extending in a spoked arrangement, along the concave lower surface, from the central region towards to the peripheral portion.

7. The packaged food product of claim 6, wherein the plurality of ribs extend in a spoked pattern from the central region.

8. The packaged food product of claim 7, wherein a depth of each of the plurality of ribs varies to track a contour of lower surface.

9. The packaged food product of claim 8, wherein each rib tapers radially outward across the main section.

10. The packaged food product of claim 9, wherein the upper surface is recessed at the central region and each rib projects from the lower surface at the central region a distance less than from the lower surface in at least a portion of the main section.

11. The packaged food product of claim 1, wherein the upper surface of the separator includes, radially outward starting at its center, a central, recessed region, a smooth main section, a raised plateau region, an annular raised section and a circumferential edge section.

12. The packaged food product of claim 11, wherein the circumferential edge section defines a portion of the peripheral region which establishes the side wall that terminates in a lower flared section.

13. The packaged food product of claim 11, wherein the at least one dough product comprises a plurality of cinnamon rolls, and the at least one additional food ingredient comprises icing.

14. A method of packaging a food product comprising:

inserting a cup, having an internal cavity for at least one additional food ingredient, within an interior of a container having at least one sidewall;

closing an end of the container;

positioning a plastic separator atop the cup, with the separator including a convex upper surface, a concave lower surface, a peripheral portion which is downturned relative to the convex upper surface and engages the at least one sidewall of the container, and a lower seating ring resting upon an upper rim of the cup;

depositing at least one dough product into the container, with the separator being located between the at least one dough product and the cup;

closing an opposing end of the container; and allowing the at least one dough product to proof and increase a pressure within the container whereupon the convex upper surface deflects downward to reduce a curvature of the convex upper surface while the peripheral portion is shifted radially to establish a friction fit with the sidewall of the container, thereby firmly retaining the separator in position atop the cup and sealing the cup from any ingress of dough.

15. The method of claim 14, further comprising: wherein the upper surface of the separator includes, radially outward starting at its center, a central, recessed region, a smooth main section, a raised plateau region, an annular raised section and a circumferential edge section.

16. The method of claim 15, wherein the circumferential edge section defines a portion of the peripheral region which establishes the side wall that terminates in a lower flared section, and wherein positioning the separator atop the cup includes directly resting the lower seating ring upon the upper rim of the cup, with the lower flared section forming an extension of the lower seating ring.

17. The method of claim 14, further comprising limiting deflection of the convex upper surface with a plurality of radially extending ribs provided along the lower surface of the separator.

18. The method of claim 17, wherein the ribs are arranged in a spoked pattern and each rib tapers radially outward towards the peripheral section.

19. The method of claim 14, wherein depositing the at least one dough product into the container includes depositing a plurality of cinnamon rolls, and inserting the cup into the container includes adding icing within the container.

* * * * *